US012636658B2

(12) United States Patent
Bockle et al.

(10) Patent No.: US 12,636,658 B2
(45) Date of Patent: May 26, 2026

(54) METHOD OF SETTING AN OPERATING CONDITION OF AT LEAST ONE MOBILE MINERAL MACHINING PLANT

(71) Applicant: Kleemann GmbH, Goppingen (DE)

(72) Inventors: Tobias Bockle, Weinstadt (DE); Tobias Kloss, Bad Gronenbach (DE); Frank Lebender, Gruibingen (DE); Thomas Kuhnle, Kirchheim unter Teck (DE)

(73) Assignee: Kleemann GmbH, Göppingen (DE)

( * ) Notice: Subject to any disclaimer, the term of this patent is extended or adjusted under 35 U.S.C. 154(b) by 615 days.

(21) Appl. No.: 18/063,390

(22) Filed: Dec. 8, 2022

(65) Prior Publication Data

US 2023/0191424 A1 Jun. 22, 2023

(30) Foreign Application Priority Data

Dec. 21, 2021 (DE) ..................... 10 2021 134 145.0

(51) Int. Cl.
*B02C 25/00* (2006.01)
*B02C 21/02* (2006.01)
(Continued)

(52) U.S. Cl.
CPC .............. *B02C 25/00* (2013.01); *B02C 21/02* (2013.01); *B02C 23/16* (2013.01); *B07B 1/005* (2013.01);
(Continued)

(58) Field of Classification Search
None
See application file for complete search history.

(56) References Cited

U.S. PATENT DOCUMENTS 3,568,938 A 3/1971 Barrot et al.
6,546,352 B2 * 4/2003 Jahn .................. G01N 15/1456 366/8
(Continued)

FOREIGN PATENT DOCUMENTS

AT 291726 B 7/1971
CN 109331971 A 2/2019
(Continued)

OTHER PUBLICATIONS

Ostroukh, Andrey, et al. "Automated process control system of mobile crushing and screening plant." Journal of Applied Engineering Science 16.3 (2018). (Year: 2018).*
(Continued)

*Primary Examiner* — Carlos R Ortiz Rodriguez
(74) *Attorney, Agent, or Firm* — Gary L. Montle; Lucian Wayne Beavers; Patterson Intellectual Property Law, PC

(57) ABSTRACT

The invention relates to a method for setting an operating state of at least one mobile mineral machining plant, in particular a mobile mineral material crusher (10), wherein a processing device (100) is provided, to which an input unit (90) is assigned, wherein at least one characteristic material value of the feed material (KM) to be machined is entered into the input unit (90), wherein at least one characteristic material value (KE) of at least one end material to be produced using the mineral machining plant is entered into the input unit (90), wherein a target machine parameter (SP) or a target machine parameter set containing several target machine parameters (SP) is generated in the processing device (100), taking into account the characteristic material value of the feed material (KM) to be machined and the characteristic material value of the end material (KE) to be produced, and wherein the at least one target machine parameter (SP) or the target machine parameter set is transferred to a control device (130) of the mineral machin-
(Continued)

ing plant and/or displayed on a display device. Such a process significantly facilitates adapting the mineral machining plant to changing crushing tasks for a machine operator.

20 Claims, 4 Drawing Sheets

(51) Int. Cl.
*B02C 23/16* (2006.01)
*B07B 1/00* (2006.01)
(52) U.S. Cl.
CPC .... *B02C 2023/165* (2013.01); *B02C 2201/02* (2013.01)

(56) References Cited

U.S. PATENT DOCUMENTS

| | | | | |
|---|---|---|---|---|
| 7,193,162 | B2 * | 3/2007 | McIsaac | G01G 19/00 177/16 |
| 9,146,554 | B2 * | 9/2015 | Hoban | G06Q 10/06 |
| 2011/0253822 | A1 | 10/2011 | Dallimore et al. | |
| 2016/0114331 | A1 * | 4/2016 | Young | B02C 13/09 241/189.1 |
| 2020/0223097 | A1 * | 7/2020 | Koppelaar | G05D 1/0285 |
| 2023/0166270 | A1 | 6/2023 | Dülfer et al. | |
| 2023/0191424 | A1 | 6/2023 | Bockle et al. | |

FOREIGN PATENT DOCUMENTS

| | | | |
|---|---|---|---|
| DE | 19727348 | A1 | 1/1999 |
| DE | 202004006887 | U1 | 8/2004 |
| EP | 2556891 | B1 | 1/2014 |
| WO | 2017093610 | A1 | 6/2017 |
| WO | 2021214230 | A1 | 10/2021 |

OTHER PUBLICATIONS

Ostroukh, A. V., et al. "Crushing and screening digital system." IOP Conference Series: Materials Science and Engineering. vol. 1159. No. 1. IOP Publishing, 2021. (Year: 2021).*
"Powerscreen crushing and screening range", Brochure, 2022 (Year: 2022).*
Tikhonov, Anatoly, and Vladimir Velichkin. "Automation for Crushing and Screening Equipment to Produce Graded Paving Crushed Stone." IOP Conference Series: Earth and Environmental Science. vol. 90. No. 1. IOP Publishing, 2017. (Year: 2017).*
European Patent Office Search Report for corresponding patent application 22215134.2, dated May 24, 2023, 10 pages.
Office Action for the German priority application for corresponding DE 10 2021 134 145.0, dated Sep. 28, 2022, 10 pages.
German Office Action for corresponding patent No. 10 2021 134 145.0 dated Aug. 27, 2025, 8 pages.

* cited by examiner

METHOD OF SETTING AN OPERATING CONDITION OF AT LEAST ONE MOBILE MINERAL MACHINING PLANT

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of German Patent Application No. 10 2021 134 145.0, filed Dec. 21, 2021, and which is hereby incorporated by reference.

BACKGROUND

The invention relates to a method for setting an operating state of at least one mobile mineral machining plant, in particular a mobile mineral material crusher having a crusher unit.

BRIEF SUMMARY

In the context of the invention, a mineral machining plant may be formed by a single machine, in particular a mineral material crushing machine or a mineral material screening machine. However, it is also conceivable that the mineral machining plant consists of several machines, which are operatively interconnected, in particular for the completion of the work task. For instance, one or more mineral material crushing machines and/or one or more screening machines may be operatively interconnected to form the mineral machining plant.

In the context of the invention, a crusher unit may be a jaw crusher unit having two crushing jaws, wherein preferably one of the crushing jaws is stationary and the other is movable. The crushing space is formed between the two crushing jaws, at least sectionally. Preferably, the crushing jaws are assigned to each other resulting in a tapering crushing space. The two crushing jaws face each other in the area of a crusher outlet, wherein the crusher outlet can be formed by a crushing gap.

In the context of the invention, a crusher unit may also be a rotary impact crusher unit. It has a crushing rotor, which accelerates the material to be broken and hurls it against at least one wall element. Such rotary impact crusher units may have impact rockers or the like as wall elements. The crushing rotor can be formed by a cone crusher or a crusher roll.

In the context of the invention, a crusher unit may also be a cone crusher, rotary crusher or gyratory crusher or a similar crusher unit.

During operation, the refining plant can be filled with the mineral material to be crushed, for instance using a wheel loader. For this purpose, the feed hopper is used to feed the material to be broken into the refining plant. Within the scope of the invention, a material feed device can be disposed in the area of the feed hopper, at least sectionally. The material feed device can be, for instance, a feed chute driven by means of a vibratory feeder. It is also conceivable that the material feed device is formed by a circulating endless belt.

The material to be broken is fed to the crusher unit via the material feed device. A screen unit can be disposed in the area of the material feed device, which screen unit is disposed upstream of the crusher unit. The screen unit has at least one sieve deck. The material to be broken can be classified on the screening deck. Coarse material that has not been screened out is routed directly to the crusher unit. A screened fraction can, for instance, be routed past the crusher unit in a bypass. This screened fraction has a sufficient particle size and does not need to be broken further. Therefore, it can be diverted past the crusher unit to prevent putting any unnecessary strain thereon.

Provision may also be made for further fractions to be screened out in the screen unit, which are then discharged from the working area of the screen unit, for instance, using a lateral discharge belt. The material passing the crusher unit in the bypass can, for instance, be routed to a crusher discharge conveyor. This crusher discharge conveyor is used to convey the material routed to the bypass in conjunction with the crushed material routed from the crusher unit out of the working area of the crusher unit. A re-screening device can be disposed downstream of the crusher unit. The material discharged from the crusher discharge conveyor can be fed to this re-screening device. There a classification is performed.

The features and functions above may be implemented in a mineral machining plant according to the invention.

From EP 2 556 891 B1 a mineral material crusher is known, which can be used to break mineral material. The crushed material is subjected to analysis at this plant. If it is determined that a material change has occurred in the feed material, the changed material is transported to a separate rock pile.

The invention addresses the problem of facilitating adapting the mineral machining plant to changing crushing tasks for a machine operator.

This problem is solved by a processing device, to which an input unit is assigned, wherein at least one characteristic material value of the feed material to be machined is entered into the input unit, wherein at least one characteristic material value of at least one end material to be produced is entered into the input unit, wherein a target machine parameter or a target machine parameter set containing several target machine parameters is generated in the processing device, taking into account the characteristic material value of the feed material to be machined and the characteristic material value of the end material to be produced, and wherein the at least one target machine parameter or the target machine parameter set is transferred to a control device of the mineral machining plant and/or displayed on a display device.

The processing device may be equipment that is directly assigned to the mineral machining plant, and is in particular part thereof. However, it is also conceivable that the processing device is separate from the mineral machining plant and can preferably be coupled thereto via a wireless connection to enable a data exchange, preferably in the bidirectional direction.

The input unit may be a device that is directly assigned to the mineral machining plant, and is in particular part thereof. However, it is also conceivable that the input unit is separate from the mineral machining plant and can preferably be coupled thereto via a wireless connection to enable a data exchange, preferably in the bidirectional direction.

The input unit may be, in particular, a computing unit having an input device, for instance, a smartphone, a tablet, a laptop or the like, which a machine operator can use to enter the input values directly in the vicinity of the mineral machining plant. However, it is also conceivable that a dispatcher enters the input values remote from the mineral machining plant, for instance. Then the finished configuration with the target machine parameters or the target machine parameter set can be transferred to the control device of the mineral machining plant.

It is also conceivable that the input unit has several spatially separated input points, which in conjunction form the input unit, wherein preferably one or more of the input points are part of the mineral machining plant and/or one or more input points are not part of the mineral machining plant.

Based on the method according to the invention, the machine user is provided with a target machine parameter, or a target machine parameter set containing several target machine parameters, taking into account the characteristic material value of the feed material to be machined and the characteristic material value of the end material to be produced. This parameter or set of parameters contains setting values or setting specifications for the mineral machining plant, wherein these values are selected in such a way that the best possible setting of the mineral machining plant results to achieve the desired end result.

The target machine parameters or the target machine parameter set can be transferred directly to the control equipment of the mineral machining plant. The machine control system can then automatically set at least some of the machine functions.

In addition, or alternatively, provision can also be made for the target machine parameters or the target machine parameter set to be displayed to the machine operator such that the machine operator can then set up and operate the mineral machining plant according to the specifications.

According to the invention, provision is made for at least one characteristic material value of at least one end material to be produced using the mineral machining plant to be entered into the input unit. Accordingly, provision may be made for the mineral machining plant to be used to produce one or more fractions of broken end material. If several fractions are generated, one or more characteristic material values can be taken into account accordingly for each fraction of the end material.

Preferably, possible characteristic material values of feed materials to be machined and/or characteristic material values of possible end products are displayed to the user at the input unit in the form of a selection list. The user can then select a suitable list entry from this selection list(s). For instance, the characteristic material values can be displayed qualitatively and/or quantitatively. This greatly facilitates the selection of characteristic material values.

According to a possible variant of the invention, provision may be made for the characteristic material value of the feed material to be machined to include information on the type and/or size of the feed material and/or information on the abrasiveness of the feed material.

In the case of a qualitative input or selection of the characteristic material value of the feed material to be machined, the characteristic material value of the feed material to be machined may be selected from a list containing at least one of the selection items “hard rock”, “soft rock”, “reinforced concrete”, “asphalt”, “construction waste”, “gravel” and/or “track ballast”.

It is also conceivable to make provision for a user-friendly selection of the characteristic material value of the feed material to be machined, for the characteristic material value of the feed material to be machined to be selected from a list containing various hardness categories, wherein the hardness categories comprise a qualitative grouping and/or a quantitative grouping, and/or for a hardness value to be entered as a specific characteristic value.

Qualitative groupings of hardness categories, for instance, can be such that they can be classified and entered as “soft, hard, very hard, etc.”

For quantitative groupings, for instance, specific ranges of hardness values may be specified.

If provision is made for a specific characteristic value for the hardness to be entered, a corresponding input facility can be provided on the input unit, for instance, which the operator can use to enter the specific hardness value.

In the same way, provision may be made for the characteristic material value of the feed material to be machined to be selected from a list, containing different abrasiveness categories, wherein the abrasiveness categories comprise a qualitative grouping and/or a quantitative grouping of abrasion characteristic values, and/or for an abrasion characteristic value to be entered as a specific characteristic value into the input unit.

If a qualitative grouping of abrasiveness categories is used, for instance, a list can be specified, in which the input can be classified as “highly abrasive, medium abrasive or slightly abrasive”.

For a quantitative grouping, specific ranges of abrasion values can again be specified, from which a user can select the applicable range.

In addition, or alternatively, it is also conceivable within the scope of the invention that the characteristic material value of the feed material to be machined is selected from a list containing various feed material sizes, wherein the feed material sizes comprise a qualitative grouping and/or a quantitative grouping and/or that the feed material size is entered as a specific characteristic value.

If a qualitative grouping of the characteristic material value of the feed material to be machined is used, for instance, a list can be specified in which the input can be classified as “large, medium large, or small”.

For a quantitative grouping, specific ranges of feed material sizes can again be specified, from which a user can select the applicable range.

According to the invention, provision may also be made for the characteristic material value of the end material(s) to be produced to include information on the size of the end material(s), in particular information on the grain size and/or the grain size distribution of the end material(s). In that case as well, the characteristic material value of the end material may be selected from a list containing various grain sizes or grain size distributions, wherein the grain sizes or grain size distributions comprise a qualitative grouping and/or a quantitative grouping and/or that the grain size or grain size distribution is entered as a specific characteristic value.

It is particularly advantageous if, within the scope of the invention, provision is made for at least one characteristic machine value of the mobile mineral material machining plant to be entered into the input unit, wherein preferably provision is made for the characteristic machine value to identify the mineral material machining plant according to its type or individually. This measure can be used to check whether an available mineral machining plant is suited in principle to complete a pending crushing task, in particular to produce the desired characteristic material value of the material. Furthermore, it is possible to select the most suitable machine for the task at hand from an available machine park having several mineral machining plants. This facilitates work scheduling.

If the mineral machining plant is identified by its type, for instance, the user can make a selection, wherein the characteristic machine value is determined as, for instance, "impact crusher", "cone crusher", "jaw crusher", or "gyratory crusher".

It is also conceivable that a machine operator enters an individual identification of the mineral machining plant into the input unit, for instance a specific individual machine number.

It is also conceivable that the characteristic machine value contains a series specification of the mineral machining plant.

A further variant of the invention may be characterized in that at least information on the physical configuration of the mobile mineral machining plant is entered into the input unit, wherein preferably provision is made for the physical configuration to include information on one or more of the tools of the mobile mineral machining plant or the tools that can be used on the mineral machining device.

There, the physical configuration can reflect the existing tooling of the mineral machining plant, wherein the user is given a choice, indicating which of these available tools can be used to complete the task at hand. Furthermore, it is conceivable that the tools, which can be installed or exchanged on the existing mineral machining plant in principle to achieve the work result, are displayed to the user. The tools can be shown to the user, for instance, according to their properties, such as material, shape, wear resistance, geometric design, mesh size, material thickness, etc. In particular, the user can be shown the tools available and/or usable in principle in the form of a selection list from which the user can choose one or more proposed tools to assemble the appropriate physical configuration.

According to a preferred variant of the invention, provision is made for an error signal to be generated if an unsuitable tool is entered, in particular if a tool is entered, which cannot be used to achieve the characteristic material value of the end material to be produced. Then, any faulty mounting of the mineral machining plant will be safely prevented.

According to a particularly preferred variant of the invention, the information on the physical configuration is supplied to the processing device indirectly via the input of the characteristic machine value. At least one basic tool equipment of the mineral machining plant is known in advance via the input of the characteristic machine value. This can be taken into account to determine the physical condition. As mentioned above, the user can also be offered the option of entering customizing tools into the processing device via the input unit and, in particular, having them checked in principle for their suitability for the crushing task in hand.

If provision is made for the information on the physical condition to be selected from one or more list(s) generated by the processing device taking into account the characteristic material value of the feed material, the characteristic material value of the end material to be produced and/or the characteristic machine value, then the operability for the user is significantly improved. In particular, then only those tools for achieving the desired physical state that are suitable in principle for accomplishing the work task at hand are displayed.

A possible method according to the invention can be characterized in that a correction machine parameter is entered via the input unit, which correction machine parameter is to be used instead of the target machine parameter or instead of at least one target machine parameter of the target machine parameter set, and in that a determination is made in the processing device whether the characteristic material value of the end material can be generated taking into account the correction machine parameter, wherein preferably provision is made for an error signal to be output at a display device if the characteristic material value of the end material cannot be generated taking into account the correction machine parameter. In this way, a user has the option to influence the operating behavior of the mineral machining plant. The used can deviate from the proposed setting and take into account correction machine parameters that are deemed suitable to the user. It is advantageous if the process control is designed in such a way that when a correction machine parameter is entered, which is not suitable for the task at hand, it is labeled with an error signal to prevent any improper operation of the machine.

In the context of the invention, a target machine parameter may be one or more of the below:

- a preset value for setting the crushing gap width,
- a preset value for setting the conveying speed of a material feeding system, which is used to route the material to be broken to a crusher unit,
- a preset value for setting the conveying speed of a material discharge system, which is used to transport the broken material downstream of the crusher unit, in particular the conveying speed of a crusher discharge conveyor, and/or
- a preset value for setting the excitation of a screen, in particular of a screening device disposed upstream and/or downstream of the crusher unit, and/or
- a preset value for setting a speed, in particular a speed of the rotor shaft of the crusher unit, and/or
- a preset value for setting the control range of a conveyor device, for instance a feeding conveyor and/or a conveyor belt, and/or
- a preset value for setting the filling level of the crusher unit, and/or
- a preset value for setting the maximum permissible difference between a maximum permissible filling level and a minimum permissible filling level in the crusher unit (Delta crusher level), and/or
- a preset value for setting the maximum permissible hysteresis of the crusher level (delay of the reaction to the change of the level), and/or
- a preset value for setting the upper swing arm of the crusher unit, and/or
- a preset value for setting the lower swing arm of the crusher unit, and/or
- a preset value for setting a magnetic separator and/or or a magnetic lifter assigned to a conveyor belt, and/or
- a preset value for setting a target value for triggering an overload signal (e.g., ring bounce detection or the like), and/or
- information to the effect that one or more upstream or downstream mineral machining plants and/or material transport plants are to be provided, and/or
- a preset value for setting a rock-pile probe.

In the context of the invention, the input unit may be permanently connected to the mineral machining plant and preferably wired to the processing device. Thus, the input unit and the processing device are part of the mineral machining plant. However, it is also conceivable that the input unit and/or the processing device are not part of the mineral machining plant, but are disposed separately therefrom. In this case, preferably provision can be made for the input unit to be directly or indirectly connected to the processing device via a wireless connection. Preferably, for instance, the processing device may be part of the mineral machining plant. The input device may be used by the user separately from the mineral machining plant, for instance in the form of a mobile terminal, such as a cell phone, tablet, laptop or the like, which mobile terminal may be wirelessly connected to the processing device.

A preferred embodiment of the invention is such that at least one characteristic material value of the feed material to be machined and at least one characteristic material value of at least one end material to be produced and the target machine parameter(s) or the correction machine parameter(s) are transferred to a central data processing device and stored there in a memory unit as a preset data set. In this way, suitable target machine parameters or a target machine parameter set, which is suitable for a specific work task, is/are held available in a central memory unit. Preferably, this may involve collecting preset data sets from various mineral machining plants in the storage unit and generating suggestions from the collected preset data sets. These suggestions can then be made available on request to a mineral machining plant if that mineral machining plant is to be used to perform a task comparable to that stored in the preset data set.

For this purpose, provision may then be made for the mineral material machining plant to be connected to the central data processing device in such a way that a preset data set stored there is transferred to the mineral machining plant. Preferably, a bidirectional connection, for instance via a network, is used to enable, on the one hand, the retrieval of the preset data set from the central storage unit. On the other hand, a preset data set can also be generated by the mineral machining plant and stored in the central storage unit.

If provision is made for the mineral crusher to have or to be assigned to a position transmitting device, in particular a GPS transmitter or a GLONASS transmitter, which transmits position data of the current position of the mineral material machining plant to a control station, and, depending on the position data of the mineral material machining plant, for at least one characteristic material value of the feed material occurring at the location to be determined in the control station and to be transmitted to the mineral material machining plant, then the procedure for entering the characteristic material value or values of the feed material into the processing device can be simplified and/or automated. In particular, characteristic material values can be correlated with site values in a database. The characteristic material value of the feed material present at the installation site of the mineral machining plant can then be determined from this database with the transmitted position data and transferred to the processing device.

The problem of the invention is also solved by a method for operating several mineral machining plants, in particular mobile mineral material crushers, wherein at least one mineral material machining plant is operated in accordance with the present disclosure.

BRIEF DESCRIPTION OF THE SEVERAL VIEWS OF THE DRAWINGS

The invention is explained in greater detail below based on an exemplary embodiment shown in the drawings. In the Figures.

DETAILED DESCRIPTION

Figure 1:
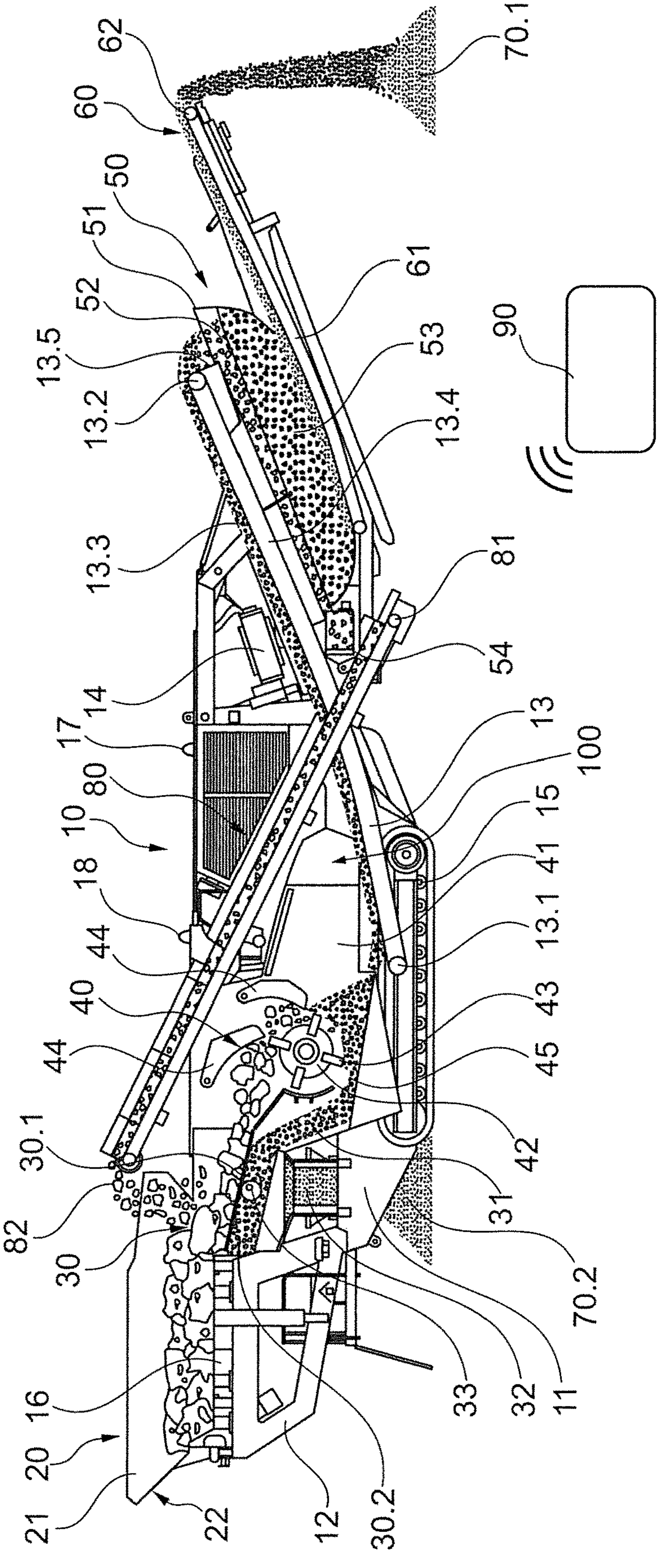
FIG. 1 shows a side view of a schematic representation of a mineral machining plant in the form of a mobile mineral material crusher.

FIG. 1 shows a mineral material machining plant in the form of a mobile mineral material crusher 10. The mineral material crusher 10 has undercarriages 15.

The mineral material crusher 10 has a chassis 11 that supports the machine components or at least part of the machine components. At its rear end, the chassis 11 has a cantilever 12. A material feed area is formed in the area of the cantilever 12.

The material feed area includes a feed hopper 20 and a material feed device 16.

The feed hopper 20 may be formed at least in part by hopper walls 21 extending in the longitudinal direction of the crusher 10 and a rear wall 22 extending transversely to the longitudinal direction. The feed hopper 20 leads to the material feed device 16.

As shown in this exemplary embodiment, the material feed device 16 may have a conveyor chute that can be driven by means of a vibratory drive. The feed hopper 20 can be used to feed material to be broken into the crusher 10, for instance using a wheel loader, and to feed it onto the conveyor chute.

From the conveyor chute, the material to be broken passes into the area of a screen unit 30. This screen unit 30 may also be referred to as a pre-screening arrangement. At least one screen deck 30.1, 30.2 is disposed in the area of the screen unit 30. In this exemplary embodiment two screen decks 30.1, 30.2 are used.

A partial fraction of the material to be broken is screened out at the upper screen deck 30.1. This partial fraction already has a sufficient particle size that it no longer needs to be broken in the crusher 10. In this respect, this screened out partial fraction can be routed past a crusher unit 40 through a bypass channel 31.

If a second screen deck 30.2 is used in the screen unit 30, a further fine particle fraction can be screened out from the partial fraction that accumulates below the screen deck 30.1. This fine particle fraction is routed to a lateral discharge conveyor 32 below the screen deck 30.2. The fine particle fraction is diverted from the lateral discharge conveyor 32 and conveyed to a rock pile 70.2 located at the side of the machine.

As FIG. 1 illustrates, the screen unit 30 may be a vibrating screen having a screen drive 33. The screen drive 33 causes the screen deck 30.1 and/or the screen deck 30.2 to vibrate. Owing to the inclined arrangement of the screen decks 30.1, 30.2 and in conjunction with the vibration motions, material on the screen decks 30.1, 30.2 is transported towards the crusher unit 40 or towards the bypass channel 31.

The material to be broken routed from the screen deck 30.1 is fed to the crusher unit 40, as shown in FIG. 1.

The crusher unit 40 may, for instance, be in the form of a rotary impact crusher unit, a cone crusher unit, or a gyratory crusher unit. The crusher unit 40 is designed in the form of a rotary impact crusher unit. The crusher unit 40 then has a crushing rotor 42 driven by a motor 41. In FIG. 1, the axis of rotation of the crushing rotor 42 is horizontal in the direction of the image depth.

For instance, the outer periphery of the crushing rotor 42 may be equipped with impact bars 43. Opposite from the crushing rotor 42, for instance, wall elements may be disposed, preferably in the form of impact rockers 44. When the crushing rotor 42 is rotating, the impact bars 43 throw the material to be broken outwards. In so doing, this material hits the impact rockers 44 and is broken due to the high kinetic energy. When the material to be broken is of sufficient particle size to allow the material particles to pass through the crushing gap between the impact rockers 44 and the radially outer ends of the impact bars 43, the broken material exits the crusher unit 40 through the crusher outlet 45.

It is conceivable that in the area of the crusher outlet 45, the broken material routed from the crusher unit 40 is combined with the material routed from the bypass channel 31 and transferred onto a belt conveyor 13 (crusher discharge conveyor). The belt conveyor 13 can be used to convey the material out of the working area of the crusher unit 40.

As shown in the drawings, the belt conveyor 13 may comprise an endless circulating conveyor belt having a slack side 13.3 and a tight side 13.4. The slack side 13.3 is used to catch and transport away the crushed material falling from the crusher outlet 45 of the crusher unit 40. At the belt ends, deflection rollers 13.1, 13.2 can be used to deflect the conveyor belt from slack side 13.3 to tight side 13.4 and vice versa. Guides, in particular support rollers, can be provided in the area between the deflection rollers 13.1, 13.2 to change the conveying direction of the conveyor belt, to shape the conveyor belt in a certain way and/or to support the conveyor belt.

The belt conveyor 13 has a belt drive, which can be used to drive the belt conveyor 13. The belt drive can preferably be disposed at the discharge end 13.5 or in the area of the discharge end 13.5 of the belt conveyor 13.

The belt conveyor 13 can be connected, for instance by means of the belt drive, to a control device by means of a control line.

One or more further belt conveyors 60 and/or a return conveyor 80 may be used, which in principle have the same design as the belt conveyor 13. In this respect, reference can be made to the above statements.

A magnet 14 can be disposed above the slack side 13.3 in the area between the feed end and the discharge end. The magnet 14 can be used to lift iron parts from the broken material and move them out of the conveying area of the belt conveyor 13.

A re-screening device 50 can be disposed downstream of the belt conveyor 13. The crusher unit 50 has a screen housing 51, in which at least one screen deck 52 is mounted. Below the screen deck 52, a housing base 53 is formed, which is used as a collection space for the material screened out at the screen deck 52.

An opening in the lower housing part 53 creates a spatial connection to the further belt conveyor 60. Here, the further belt conveyor 60 forms its feed area 61, wherein the screened material in the feed area 61 is directed onto the slack side of the further belt conveyor 60. The further belt conveyor 60 conveys the screened material towards its discharge end 62. From there, the screened material is transferred to a rock pile 70.1.

The material not screened out at the screen deck 52 of the re-screening device 50 is conveyed from the screen deck 52 onto a branch belt 54. The branch belt 54 can also be designed as a belt conveyor, i.e., reference can be made to the explanations given above with respect to the belt conveyor 13. In FIG. 1, the transport direction of the branch belt 54 extends in the direction of the image depth.

At its discharge end, the branch belt 54 transfers the un-screened material, also referred to as oversize material, to the feed area 81 of the return conveyor 80. The return conveyor 80, which may be a belt conveyor, conveys the oversize material towards the feed hopper 20. At its discharge end 82, the return conveyor 80 transfers the oversize material into the material flow, specifically into the material feed area. The oversize material can therefore be returned to the crusher unit 40 and crushed to the desired particle size.

As FIG. 1 further shows, an input unit 90 is assigned to the mineral material crusher 10. The input unit 90 may be permanently secured to or separate from the mineral material crusher 10. In particular, the input unit may be in wired or radio communication with a processing device 100 of the mineral material crusher 10 for the purpose of exchanging data. It is also conceivable that the processing device 100 is not part of the mineral material crusher 10, but that it is part of a decentralized unit that is connected to the input unit 90 and to the mineral material crusher 10 for the purpose of exchanging data. Furthermore, it is conceivable that the processing device 100 is part of the input unit 90.

The processing device 100 is connected to a control device of the mineral material crusher 10, wherein data can be transferred from the processing device 100 to the storage device (and preferably vice versa).

Figure 2:
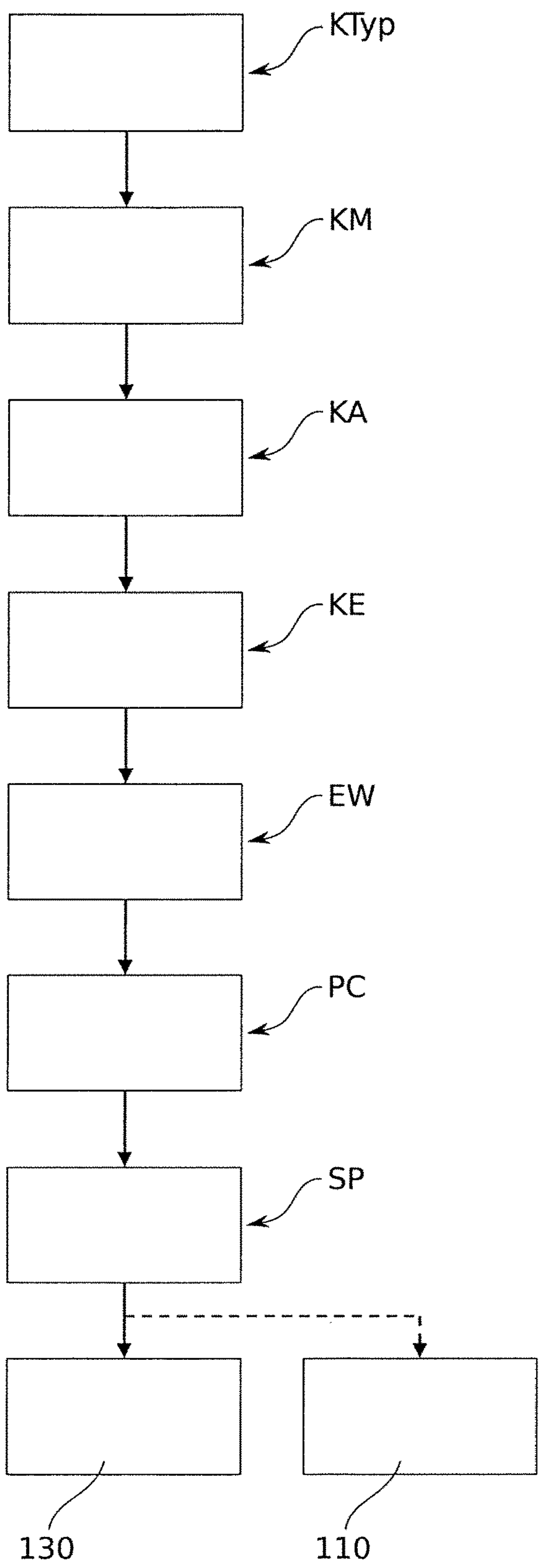
FIG. 2 shows a schematic representation of a block diagram.

FIG. 2 illustrates a process according to the invention in more detail. With this method, it is possible to generate target machine parameters SP or a target machine parameter set with one or more target machine parameters SP in the processing device 100. These data can then be transferred to a control device 130 of the mineral material crusher 10.

As this representation illustrates, a characteristic machine value Ktyp may be entered into the input unit 90 and transferred to the processing device 100.

For a user-friendly guidance, provision can be made, for instance, for the characteristic machine value Ktyp to be selected from a list that characterizes available machines according to their typification. For instance, a selection list can be displayed showing “impact crushers”, “cone crushers”, “jaw crushers”, “gyratory crushers”, or “screening machines” as selection options. The user can then select one of these types to use it to enter the characteristic machine value Ktyp into the input unit 90.

It is also conceivable that the mineral material machining plant, in particular the mineral material crusher 10 is determined based on its design in a selection list. This may involve displaying manufacturer-specific labels in a drop-down list, which can then be selected by the user. Finally, it is also conceivable that an individual machine identification is entered into the input unit 90 as the characteristic machine value Ktyp.

Preferably, the operator is shown available possible machines in one or more selection lists from which a machine can be selected.

Furthermore, a characteristic material value of the feed material KM to be machined may be entered to the input unit 90 and transferred to the processing device 100.

Preferably, the operator is shown available characteristic material values of the feed material KM in one or more selection lists, from which at least one can be selected.

Then the selection of the material to be machined can be made from a list that qualitatively divides the material to be machined into different categories, for instance. An example of this is the classification as follows: “Hard rock, soft rock, reinforced concrete, asphalt, construction debris, gravel, track ballast.” From these options, the user can select one to enter the characteristic material value of the feed material KM into the input unit 90 to transfer this value or a value correlating with this input value to the processing device 100.

It is also conceivable that the material to be machined is qualitatively divided into different hardness categories. An example of this is the classification as follows: "soft, hard, very hard, etc." From these options, the user can select one to enter the characteristic material value of the feed material KM into the input unit 90 such that this value or a value correlated thereto is transferred to the processing device 100. It is also conceivable that hardness categories are specified in the form of specific hardness value ranges. It is also conceivable that specific hardness values of the feed material can be entered into the input unit 90.

It is conceivable that a selection list contains qualitative or quantitative categories from which the user can select an entry. In particular, it is conceivable that the operator can make a selection of the characteristic material value or values of the feed material KM from various characteristic values of a selection list, which qualify or quantify the material size of the feed material. For instance, possible grain sizes and/or the grain size distributions of the feed material can be displayed in a selection list and the user can make a selection from this list. It is also conceivable that the user enters a specific input value into the input unit 90 as the characteristic material value of the feed material KM, which individually specifies the grain size or the grain size distribution of the end material.

Furthermore, it may be feasible, in an additional step, that an abrasion characteristic value KA is entered into the input unit 90 as a characteristic material value of the feed material KM to be machined and is transferred to the processing device 100.

Preferably, the operator is shown one or more selection lists of available material characteristics of the feed material KA, from which at least one can be selected.

Again, the selection list may contain a qualitative categorization from which the user can select an entry. For instance, a qualitative categorization may be as follows: "high abrasiveness, medium abrasiveness or low abrasiveness". It is also conceivable that a qualitative categorization is included in a selection list, wherein certain abrasiveness ranges are predetermined as selection points, one of which can be selected by the user to enter the abrasiveness characteristic value KA into the input unit 90. Finally, it is also conceivable that an input mask is provided on the input unit 90, in which the user can enter a specific present abrasion characteristic value KA of the feed material.

Further, according to the invention, in one step, a characteristic material value of the end material KE to be produced is entered to the input unit 90 and transferred to the processing device 100.

Preferably, available characteristic material values of the end material KE to be produced are displayed to the operator in one or more selection lists, from which at least one can be selected.

Again, the selection list may contain qualitative or quantitative categories from which the user can select an entry. In this context, it is conceivable that the operator can make a selection of the characteristic material value or values of the end material KE from various characteristic values of a selection list, which qualify or quantify the material size of the end material to be produced. For instance, possible grain sizes and/or the grain size distributions of the end material can be displayed in a selection list and the user can make a selection from this list. It is also conceivable that the user enters a specific input value into the input unit 90 as the characteristic material value of the end material KE, which individually specifies the grain size or the grain size distribution of the end material.

Furthermore, it may be feasible, in a method step, that at least one characteristic value or information on the physical configuration EW of the mineral material machining plant, in particular the mineral material crusher 10 may be entered into the input unit 90, and transferred to the processing device 100.

Preferably, the operator is shown one or more selection lists of available tools, for determining the physical configuration EW. If the characteristic machine value Ktyp has already been entered in a previous step, it is now advantageous to display only those tools as available tools that are suitable for the specific machine or machine type.

If the characteristic material values of the feed material and the end material KM and KE have already been entered in a previous process step, then advantageously only those tools are now displayed as available tools which are suitable for the pending machining task to achieve the desired final result in principle.

The user can now select the appropriate options from the information displayed for the EW physical configuration, and enter them in the input unit. In other words, the user can now choose the desired tools from those proposed and those the user deems suitable, to obtain the desired physical configuration EW.

It is conceivable that eligible tools are categorized according to their properties. For instance, tools may be categorized by properties such as material, shape, wear resistance, geometric design, mesh size of a screen coating, material thickness, and so on.

In a subsequent correction step, a user can also make a correction to the physical configuration EW proposed, wherein single or multiple configuration proposals are corrected by entering a correction machine parameter. In other words, the physical configuration EW is changed in this way. This suggested change is entered into the input unit 90 and transferred to the processing device 100. There it is then determined whether the machining task at hand can be sensibly solved based on the desired correction machine parameter PC. If this is not possible, the user will receive an error message (not shown). In this case, the user is then offered the opportunity to change the physical configuration EW in the form of a correction loop.

If the input values are suitable to accomplish the crushing task at hand, at least one target machine parameter SP or a target machine parameter set comprising one or more target machine parameters SP is generated in the processing device 101. The target machine parameter SP or the target machine parameter set is then transferred to the control device 130 of the mineral machining plant, in particular of the mineral material crusher 10. The control device 130 then preferably automatically causes the setting of individual or all machine functions, based on the target machine parameters SP. Furthermore, it is conceivable that the user is shown how to configure the mineral machining plant and with which tools on a display device, for instance on the input unit 90. Subsequently, the mineral machining plant is then operated based on the specified target machine parameters SP.

It is also conceivable that the target machine parameter SP or the target machine parameter set in conjunction with at least the characteristic material value of the feed material KM and the characteristic material value of the end material KE are transferred in the form of a preset data set to a separate central data processing device 110, as shown by the dashed line in FIG. 2. The transmission can be performed for instance using a suitable wireless connection, for instance Internet connection, for which the mineral machining plant has a data interface 18 (see FIG. 1).

Figure 3:
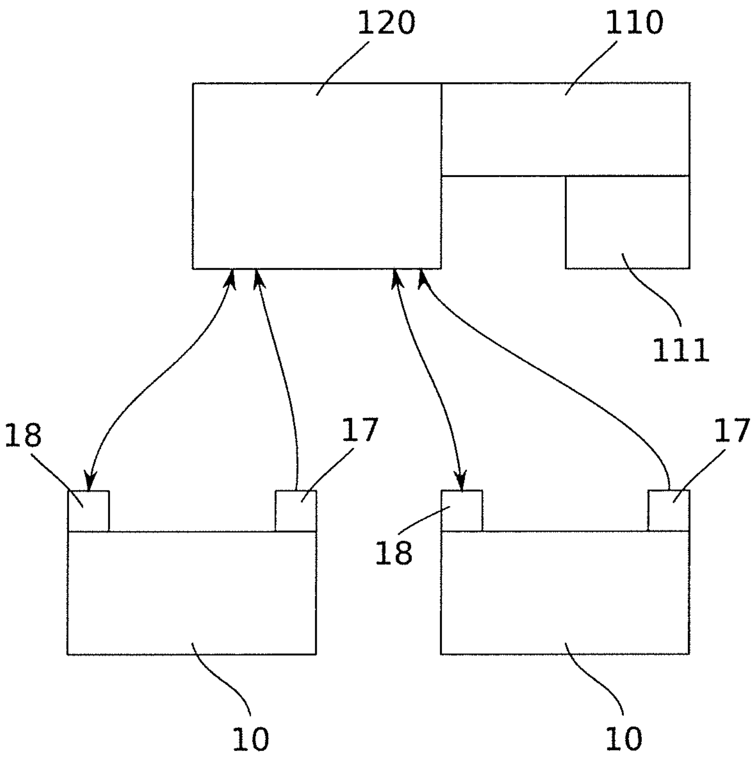
FIG. 3 shows a schematic representation of an arrangement of several mineral machining plants.

FIG. 3 shows a diagram illustrating several mineral machining plants, in particular a mineral material crusher 10. Each of these mineral machining plants is connected to a control center 120 via its data interface 18 to transfer the preset data set to be processed in the central data processing device 100 and stored in a memory unit 111.

In this way, preset data sets can be received from multiple mineral material machining plants, modified if necessary, and stored. In this way, a database is formed that holds preset data sets for specific upcoming machining tasks, which can then be made available to a mineral machining plant.

As FIG. 3 further illustrates, a position-transmitting device 17 may also be assigned to a mineral machining plant. This position-transmitting device 17 permits a mineral machining plant to determine its current position and transmit it to the control center 120. In a memory unit of the control center 120, position values may be correlated with one or more feed characteristic material values KM in a database.

Based on the position signal received from the position-transmitting device 17, the characteristic material value of the feed material KM present for the position of the mineral machining plant can then be determined from the database and transferred to the processing devices 100.

Figure 4:
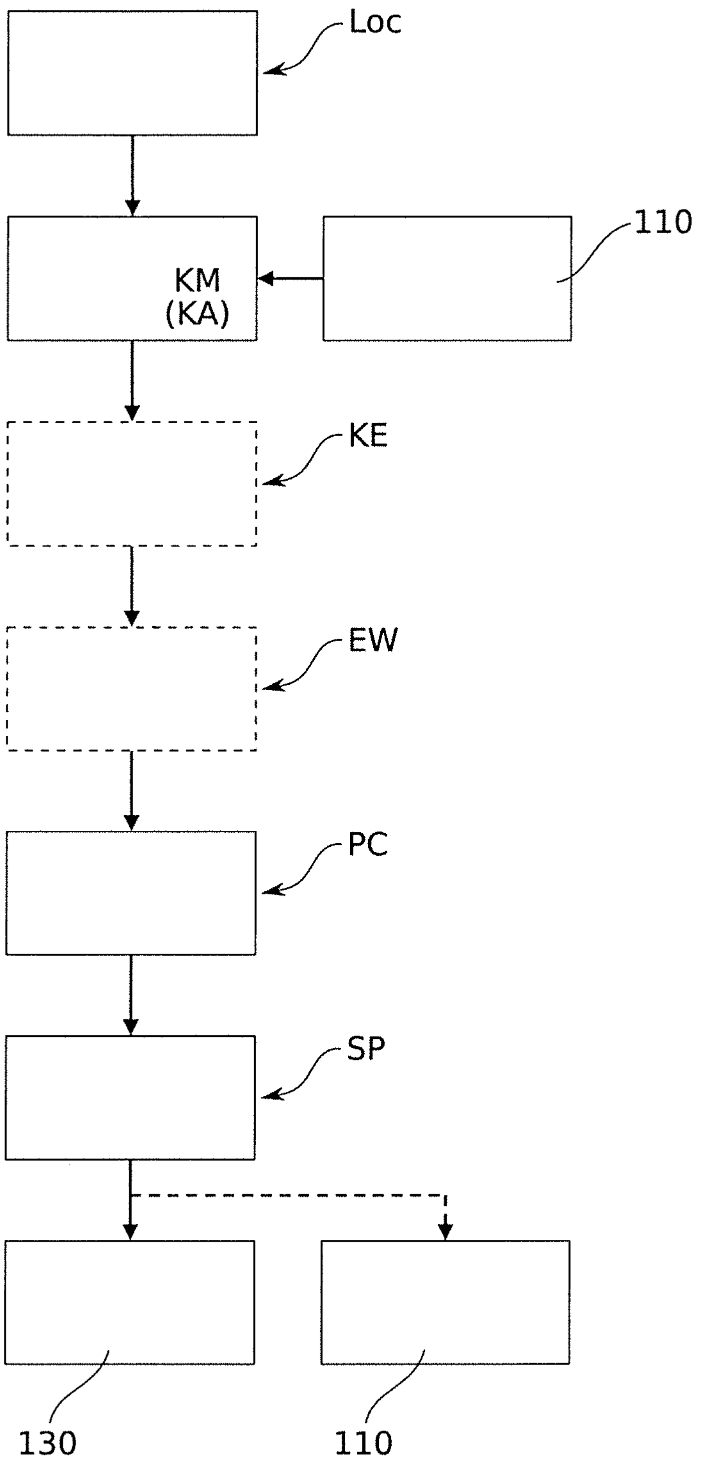
FIG. 4 shows a schematic representation of a further block diagram.

This is further specified in FIG. 4. As this representation illustrates, the position-transmitting device 17 is used to transfer the position data LOC. The central data processing device 110 then transfers the characteristic material value or values of the feed material KM, which may include the abrasion characteristic value KA.

Optionally, input facilities for entering the characteristic material value of the end material KE and for information on the physical configuration EW can also be provided at the input unit, as explained above. Furthermore, an option to enter a correction machine parameter PC can follow. To avoid repetitions, reference is made to the explanations above.

Subsequently, the at least one target machine parameter SP or the target machine parameter set is transferred to the control device 130 or the central data processing device 110 in the same manner as explained above with respect to FIG. 2.

What is claimed is:

1. A method for setting an operating state of at least one mobile mineral machining plant for a pending crushing task, the method comprising:

prior to the crushing task, receiving, via an input unit assigned to a processing device, at least one characteristic material value of a feed material to be machined, and at least one characteristic material value of at least one end material to be produced using the mineral machining plant;

generating, via the processing device, a target machine parameter or a target machine parameter set containing several target machine parameters, taking into account the characteristic material value of the feed material to be machined and the characteristic material value of the end material to be produced; and wherein the at least one target machine parameter or the target machine parameter set is transferred to a control device of the mineral machining plant and/or displayed on a display device;

wherein the crushing task is performed using the at least one target machine parameter or the target machine parameter set.

2. The method of claim 1, wherein the characteristic material value of the feed material to be machined contains information on a type and/or size of the feed material and/or on a grain distribution of the feed material and/or information on an abrasiveness of the feed material.

3. The method of claim 2, wherein the characteristic material value of the feed material to be machined contains qualitative information on the type and/or size of the feed material, and/or on the grain distribution of the feed material, and/or on the abrasiveness of the feed material.

4. The method of claim 1, wherein the characteristic material value of the feed material to be machined is selected from a list comprising:

one or more of the selection items "hard rock", "soft rock", "reinforced concrete", "asphalt", "rubble", "gravel", and/or "track ballast"; and/or different hardness categories, wherein the hardness categories comprise a qualitative grouping and/or a quantitative grouping, and/or in that a hardness value is entered as a specific characteristic value; and/or different abrasiveness categories, wherein the abrasiveness categories comprise a qualitative grouping and/or a quantitative grouping of abrasion characteristic values, and/or in that an abrasion characteristic value is entered as a specific characteristic value into the input unit; and/or different feed material sizes, wherein the feed material sizes comprise a qualitative grouping and/or a quantitative grouping and/or the feed material size is entered as a specific characteristic value.

5. The method of claim 1, wherein the characteristic material value of the at least one end material to be produced includes information on a grain size and/or grain size distribution of the at least one end material.

6. The method of claim 1, wherein at least one characteristic machine value of the mobile mineral machining plant is entered into the input unit, wherein preferably provision is made for the characteristic machine value to characterize the mineral machining plant according to its type or individually.

7. The method of claim 6, wherein the characteristic machine value is selected from a list containing different machine types or wherein an individual machine identification of the mobile mineral machining plant is entered into the input unit as a characteristic machine value.

8. The method of claim 7, wherein the characteristic machine value is selected from a list comprising at least one of an "impact crusher", "cone crusher", "jaw crusher", "gyratory crusher", and/or "screen", or wherein the machine parameter contains a series specification of the mineral machining plant.

9. The method of claim 1, wherein at least one information on a physical configuration of the mobile mineral machining plant is entered into the input unit, wherein provision is made for the physical configuration to include information on one or more of the tools of the mobile mineral machining plant or the tools that are available for use on the mineral machining device.

10. The method of claim 9, wherein an error signal is generated and/or a recommendation for an alternative equipment is suggested if a tool is entered which cannot be used to achieve the characteristic material value of the at least one end material to be produced.

11. The method of claim 9, wherein the information on the physical configuration is supplied to the processing device indirectly via the input of the characteristic machine value.

12. The method of claim 9, wherein the physical configuration information is selected from a list generated by the processing device taking into account the characteristic material value of the feed material, the characteristic material value of the at least one end material to be produced and/or the characteristic machine value.

13. The method of claim 1, wherein:

a correction machine parameter is entered via the input unit, which correction machine parameter is used instead of the target machine parameter or at least one target machine parameter of the target machine parameter set; and a determination is made in the processing device whether the characteristic material value of the at least one end material can be generated taking into account the correction machine parameter, wherein provision is made for an error signal to be output at a display device if the characteristic material value of the at least one end material cannot be generated taking into account the correction machine parameter.

14. The method of claim 1, wherein target machine parameters may be one or more of:

a preset value for setting a crushing gap width;

a preset value for setting a conveying speed of a material feeding system, which is used to feed the material to be broken to a crusher unit or a screening device;

a preset value for setting a conveying speed of a material discharge system, which is used to transport broken material downstream of the crusher unit or of the screening device;

a preset value for setting an excitation of a screening device disposed upstream and/or downstream of the crusher unit;

a preset value for setting a speed, in particular a speed of the rotor shaft of the crusher unit;

a preset value for setting a control range of a conveyor device;

a preset value for setting a filling level of the crusher unit;

a preset value for setting a maximum permissible difference between a maximum permissible filling level and a minimum permissible filling level in the crusher unit;

a preset value for setting a maximum permissible hysteresis of the crusher level;

a preset value for setting an upper swing arm of the crusher unit;

a preset value for setting a lower swing arm of the crusher unit;

a preset value for setting a magnetic separator and/or or a magnetic lifter assigned to a conveyor belt;

a preset value for setting a target value for triggering an overload signal;

information to the effect that one or more upstream or downstream mineral machining plants and/or material transport plants are to be provided; and/or a preset value for setting a rock-pile probe.

15. The method of claim 1, wherein the input unit is fixedly connected to the mineral machining plant and wired to the processing device, or the input unit is directly or indirectly connected to the processing device via a wireless connection.

16. The method of claim 1, wherein the at least one characteristic material value of the feed material to be machined and the at least one characteristic material value of the at least one end material to be produced and the target machine parameter are transferred to a central data processing device and stored there in a memory unit as a preset data set.

17. The method of claim 16, wherein the mineral machining plant is in communication with the central data processing device such that the preset data set stored therein is connected to the mineral machining plant.

18. The method of claim 1, wherein:

the mineral machining plant or an associated screening machine has or is assigned to a position-transmitting device which transmits position data of a current position of the mineral machining plant to a control station; and the control station, depending on the position data of the mineral machining plant, determines and transmits to the mineral machining plant at least one characteristic material value of the feed material occurring at the current position.

19. The method of claim 1, wherein:

the mineral machining plant or an associated screening machine has or is assigned a position-transmitting device which transmits position data of a current position of the mineral machining plant to a control station;

as a function of the position data, at least one target machine parameter or at least one target machine parameter set comprising a plurality of target machine parameters is determined and displayed to the operator; and a user-selected at least one target machine parameter or at least one target machine parameter set is transferred to the control device of the mineral machining plant.

20. The method of claim 1, further comprising operating the at least one mobile mineral machining plant.

* * * * *